United States Patent [19]
Piri et al.

[11] Patent Number: 5,233,420
[45] Date of Patent: Aug. 3, 1993

[54] SOLID STATE TIME BASE CORRECTOR (TBC)

[75] Inventors: John L. Piri; Marc L. Moulton, both of Ridgecrest, Calif.

[73] Assignee: The United States of America as represented by the Secretary of the Navy, Washington, D.C.

[21] Appl. No.: 721,821

[22] Filed: Apr. 10, 1985

[51] Int. Cl.[5] ............................................. H04N 5/04
[52] U.S. Cl. .................................... 358/149; 360/36.2
[58] Field of Search ................ 358/19, 148, 149, 320, 358/339; 360/36.2, 36.1

[56] References Cited

U.S. PATENT DOCUMENTS

| | | | |
|---|---|---|---|
| 3,573,358 | 4/1971 | Markevitch . | |
| 3,887,941 | 6/1975 | Dann et al. | 360/36.1 |
| 4,074,307 | 2/1978 | Dischert et al. . | |
| 4,101,939 | 7/1978 | Owen et al. | 358/339 |
| 4,110,785 | 8/1978 | Dischert et al. | 358/19 |
| 4,134,131 | 1/1979 | Hopkins, Jr. | 358/149 |
| 4,214,262 | 7/1980 | Mizukami | 360/36.2 |
| 4,215,376 | 7/1980 | Mach | 358/339 |
| 4,231,063 | 10/1980 | Ito et al. | 358/19 |
| 4,249,198 | 2/1981 | Ito et al. | 358/19 |
| 4,287,529 | 9/1981 | Tatami et al. . | |
| 4,297,728 | 10/1981 | Lowe | 360/36.1 |
| 4,389,678 | 6/1983 | Mizukami et al. | 360/36.2 |
| 4,445,135 | 4/1984 | Heitmann et al. | 358/19 |

Primary Examiner—Jin F. Ng
Attorney, Agent, or Firm—Melvin J. Sliwka; John L. Forrest, Jr.

[57] ABSTRACT

Synchronization of remotely originating video signals to a standardized frequency is assured on a field-by-field basis. The video signals are digitized, multiplexed and stored in fields in accordance with their horizontal and vertical sync signals. A reading out of storage, demultiplexing and reconversion to video signals at the standardized frequency on a field-by-field basis allows a real time presentation to standard equipments at a standardize rates.

8 Claims, 13 Drawing Sheets

SOLID STATE TIME BASE CORRECTOR (TBC)

STATEMENT OF GOVERNMENT INTEREST

The invention described herein may be manufactured and used by or for the Government of the Untied States of America for governmental purposes without the payment of any royalties thereon or therefor.

BACKGROUND OF THE INVENTION

Electronic circuits which receive video signals frequently have a need to ensure a synchronization between the incoming signals and the rate at which the system operates. This phenomenon is usually referred to as time base correction and is often required particularly when digital signal processing is performed on video signals because the digital video information to be processed must be in sync with a standard format to be able to process it. Time base correctors can synchronize to non-synchronous video sources, store a field of video information for electronic shuttering (that is taking a snap-shot of the video information stored, similar to a camera versus a movie projector), quantize and digitize for recursive filtering (summing several looks at a scene to eliminate background noise so that the real picture is reinforced with each view and the sporadic/electronic background noise is thereby attenuated), and perform other types of digital processing.

To date, no real time solid state TV field processor on a cathode ray tube is known to be available which is small in size or synchronized such that it handles a frame in like manner (a frame is two fields placed in such a manner to give the appearance of 525 lines, rastored twice by interlacing the beam). One-line time base correctors and full scan converters are available; however, such devices don't meet the small scale, solid state compactness and reliability required. The one line time base correctors and full scan converters compromise a CRT display and a video camera looking at the display in real time and tend to be very expensive. They also are of low reliability when attempted to be used in highly demanding military applications.

Typical of the variety of approaches is the apparatus of U.S. Pat. No. 3,573,358 which has a time base correction to an electron beam to correct alignment error of a film. It gets its correlation signals from phase and quadrature signals and not from a digitized memory. The synchronizing arrangement of U.S. Pat. No. 3,887,941 uses a process of phase-locked loops and counters to regenerate the sync of a video tape recorder and appears not be be capable of correcting two different time bases. The signal processing of U.S. Pat. No. 4,074,307 employs CCD devices for memory and correct one to two lines at a time. The CCD's purpose appears to be incapable of providing for full field or frame time base correction. Another clock generator disclosed in U.S. Pat. No. 4,110,785 allows for the processing of only one or two lines at a time and, while a noteworthy advance, field or frame correction is not possible in this device. The time base error correcting apparatus of U.S. Pat. No. 4,287,529 is similar in application yet its design allows for the correction of one or two lines at a time and may be lacking of a full field or frame of memory for vertical correction so that timing of frames or fields due to vertical instabilities is beyond its capabilities. The corrector system of U.S. Pat. No. 4,297,728 employs CCD's for one line correction. Full field or framed time base errors are not corrected largely because of the CCD's.

Thus, there is a continuing need in the state of the art for a solid state time base corrector for synchronizing an external video field with a local time base crystal that generates its own time frame reference for a one full scan of a CRT display.

SUMMARY OF THE INVENTION

The invention is directed to providing an apparatus for synchronizing an externally originating video field with a local standard frequency source. An externally originating video field, coming for example, from a camera, a tape, a disk or a computer memory, is fed to the apparatus wherein the horizontal and vertical sync pulses are stripped and separated from it. The externally originating video field signal is converted into digital form and stored in a random access memory at a rate initiated by a circuit that writes in the lines and fields of the externally originating video field signal. A standard frequency source within the apparatus actuates a read address and synchronization generator that reads the stored lines and fields of the externally originating video field signals at the standard frequency rates. A multiplexer on the input side of the random access memory and a demultiplexer on the output side of the random access memory are provided to accommodate the storage rates of the memory so that the video information can be written in and read out of the memory in a field-by-field real time basis. A digital-to-analog converter reconverts the information of the externally originating video field signal and allows the feeding out of a video signal at the standard frequency rate.

It is a prime object of the invention to provide a time base corrector that enables a field-by-field synchronization of externally originating video data to a standard frequency.

Another object is to provide a compact, reliable, solid-state time base corrector that accommodates field by field data conversions by an integral random access memory.

Still another object is to provide an improved time base corrector for video information that does not require an input video source that is stable from line to line or field to field to avoid the problems associated with wow and flutter.

Yet another object is to provide a time base corrector having the automatic capability to store fields of video information so that the system can take snap shots of a field-of-view in a random access memory.

Yet another object is to provide a time base corrector having a digital as well as an analog interface capability.

Still another object is to provide for a multiple unsynchronzied video source time base corrector that can be overlaid due to a synchronzied local time base for all channels.

These and other objects of the invention will become more readily apparent from the ensuing specification and claims when taken with the appended drawings.

DESCRIPTION OF THE PREFERRED EMBODIMENT

Figure 1:
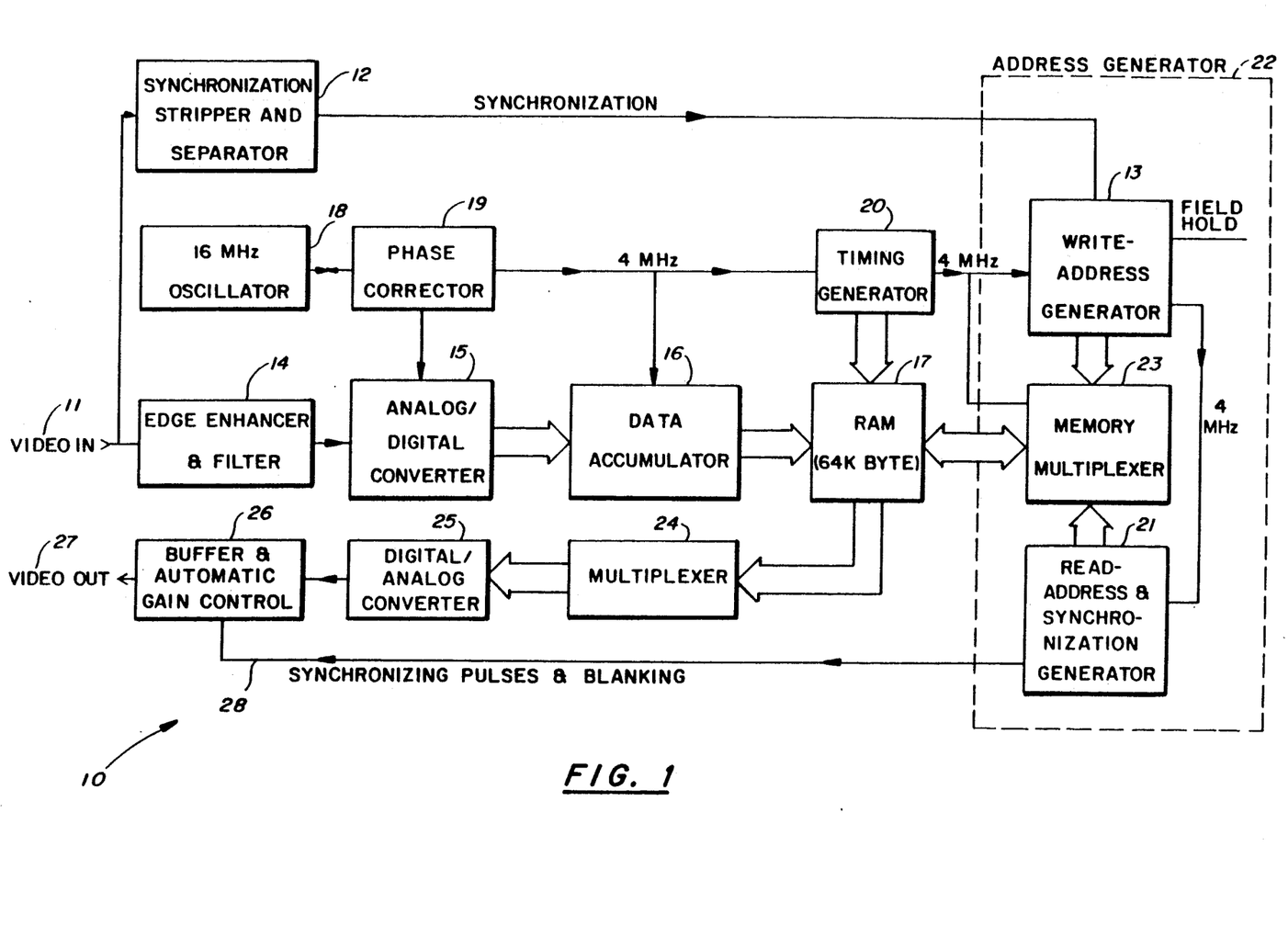
FIG. 1 is a block diagram of the time base corrector.

Referring now to the drawings and in particular to FIG. 1, a time base corrector 10 has been designed to avoid the problems associated with wow and flutter in an incoming video signal. The video signal could originate from a variety of sources such as a camera, a tape, a disc or a computer memory.

The time base corrector 10 receives the externally originating video field signal at an input 11 and stabilizes this signal with a standard frequency from an oscillator 18 to provide a standard frequency time base corrected output signal at output 27. Within the time base corrector the externally originating video field signal is quantized and converted to provide accurate digital pulses of the proper amplitude and period of the video information by means of a timed electronic window in synchronization with a standard clock. The video signals from external unstable sources such as video recorders, have notorious inherent timing unreliability due to mechanical/motor driven tapes and need to have these signals stabilized, that is, to put the external video signals in sync with an accurate standard crystal oscillator reference coming from the oscillator.

To repeat the time base corrector provides stabilization in the form of discretely timed digital information in sync with a standard clock so that digital processing can be performed on incoming video signals by operatively interconnected associated equipments. The frequency at which this digital processing is performed has been established by the National Television Standard Committee. Therefore, a time base corrector such as that herein disclosed is necessary for digital processing of video information that might come from a variety of unstable sources.

One of the favorable features of the invention that is not immediately apparent from the ensuing description taken with the detailed structure set forth in the drawings is that the time base corrector is small, less than 210 cubic inches and consumes less than 15 watts of power. The corrector will hold a full field (one full CRT scan) of video in its memory, and will correct or store black and white video from interlaced (for example a frame which is two fields of view rastored interlaced on CRT) or non-interlaced (for example a field, one full rastor of a CRT) sources. The synchronization format for the output of the corrector is generated from a programmed read only memory where synchronization format changes such as timing period interval of pulses etc., can be made through software modifications usually by simply reprogramming the programmable read only memory. The corrector memory is arranged in a 256×256 pixel configuration with 256 gray levels. A pixel is a picture element (electric pulse of a discrete amplitude). Therefore, in addition to the 256 shades of gray per pixel, there are 256 pixels per line and 256 lines per field storage capability. The 256×256 pixel memory configuration gives a reasonable satisfactory picture retrieving capability though the memory is not necessarily limited thereto. The same pixel memory configuration limits the hardware otherwise necessary. This has been found to be good enough for a 9 square inch display although the resolution may be somewhat less than satisfactory for a 25" display. However for the 9" display a full 64 kilobyte field of storage is considered adequate and has thus been selected as the storage capability of the random access memory 17.

Figure 8:
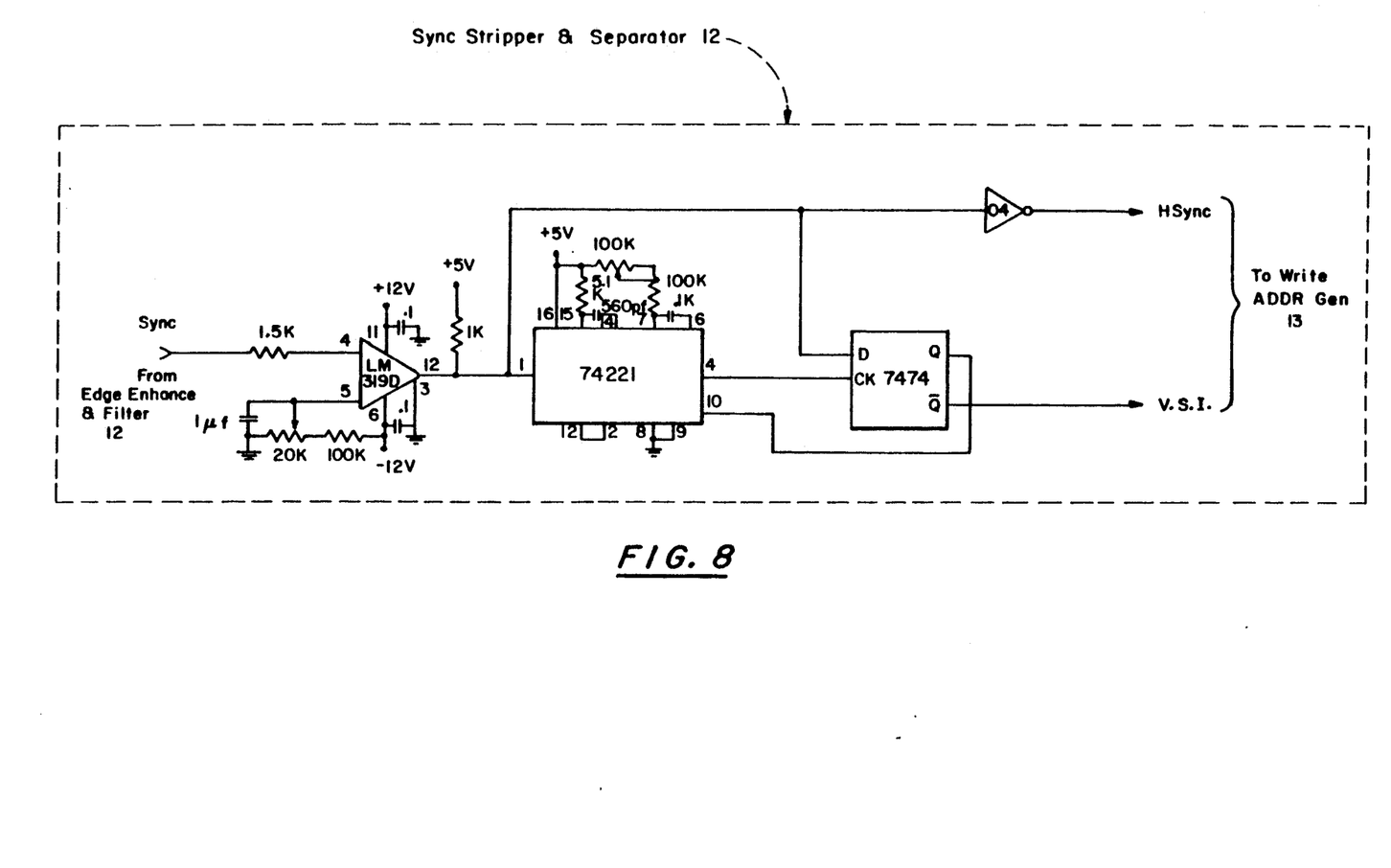
FIG. 8 depicts the circuit elements of the sync stripper and separator.

Looking now once again to the functional block diagram of FIG. 1 of the drawings, the time base corrector 10 receives fields of video at an input 11 and stabilizes each field on a field by field basis for an output 27 for interconnected standardized video equipments. The input couples externally originating fields of video to a synchronization stripper and separator 12 which strips the horizontal sync pulses and separates the vertical sync pulses from the incoming fields of video. The details of the circuit for effecting this operation are shown in detail in FIG. 8.

Figure 2:
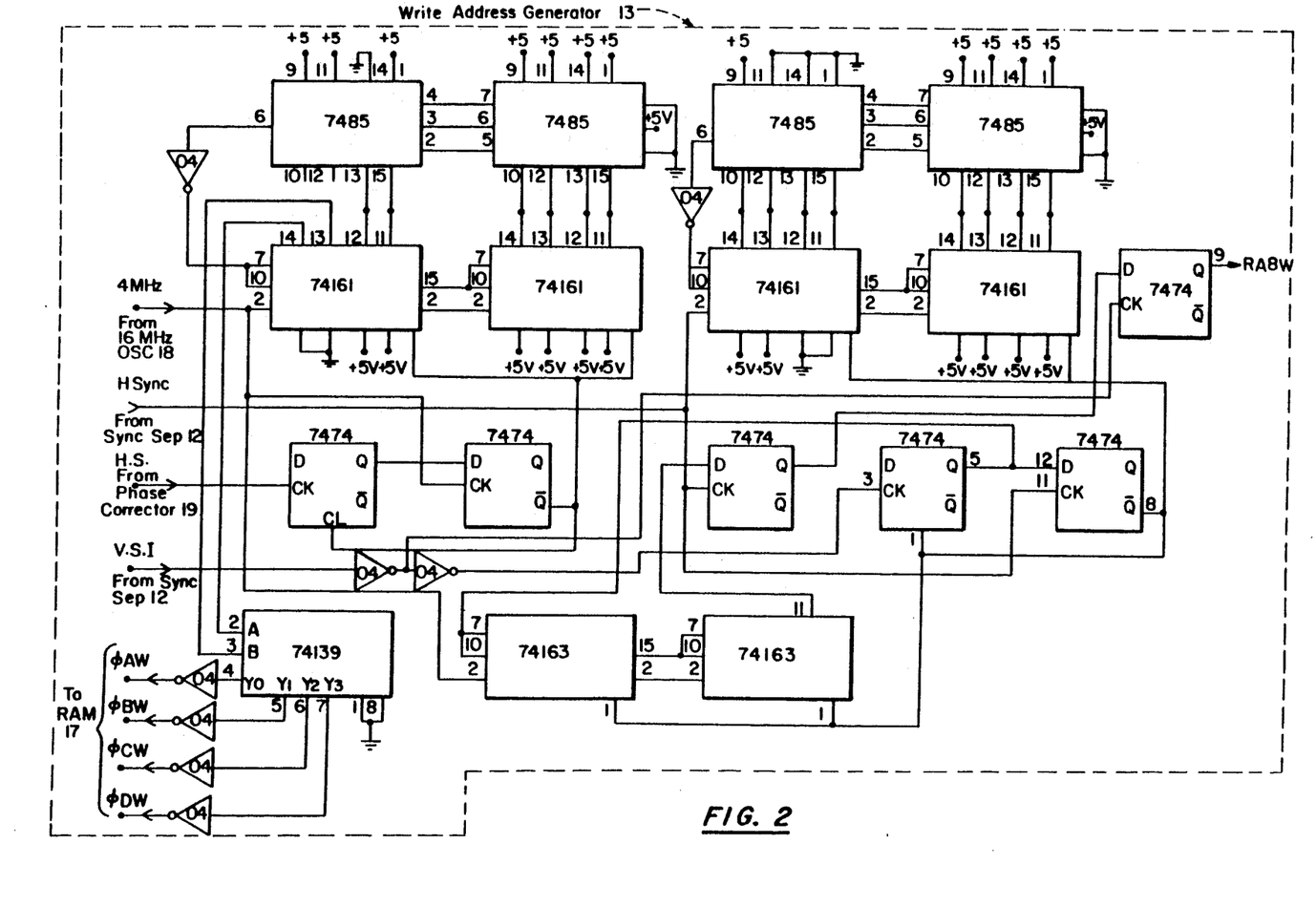
FIG. 2 is a schematic portrayal of the write-address generator and its interconnections with associated equipment.

The horizontal and vertical pulses are fed to a write-address generator 13 which forms a part of an address generator circuit 22. Its function is to actuate an interconnected memory multiplexer 23 such that it writes the information content of the externally originating video signal into a memory, random access memory 17. Elaboration on these functions will follow below. The details of the write-address generator are set forth in FIG. 2.

The incoming video signal passes through an edge enhancer and filter circuit 14 that shapes and rids unwanted signals and passes the received video signal to an analog-to-digital converter 15. The edge enhancer and filter circuit is shown in detail in FIG. 4b.

Figure 10:
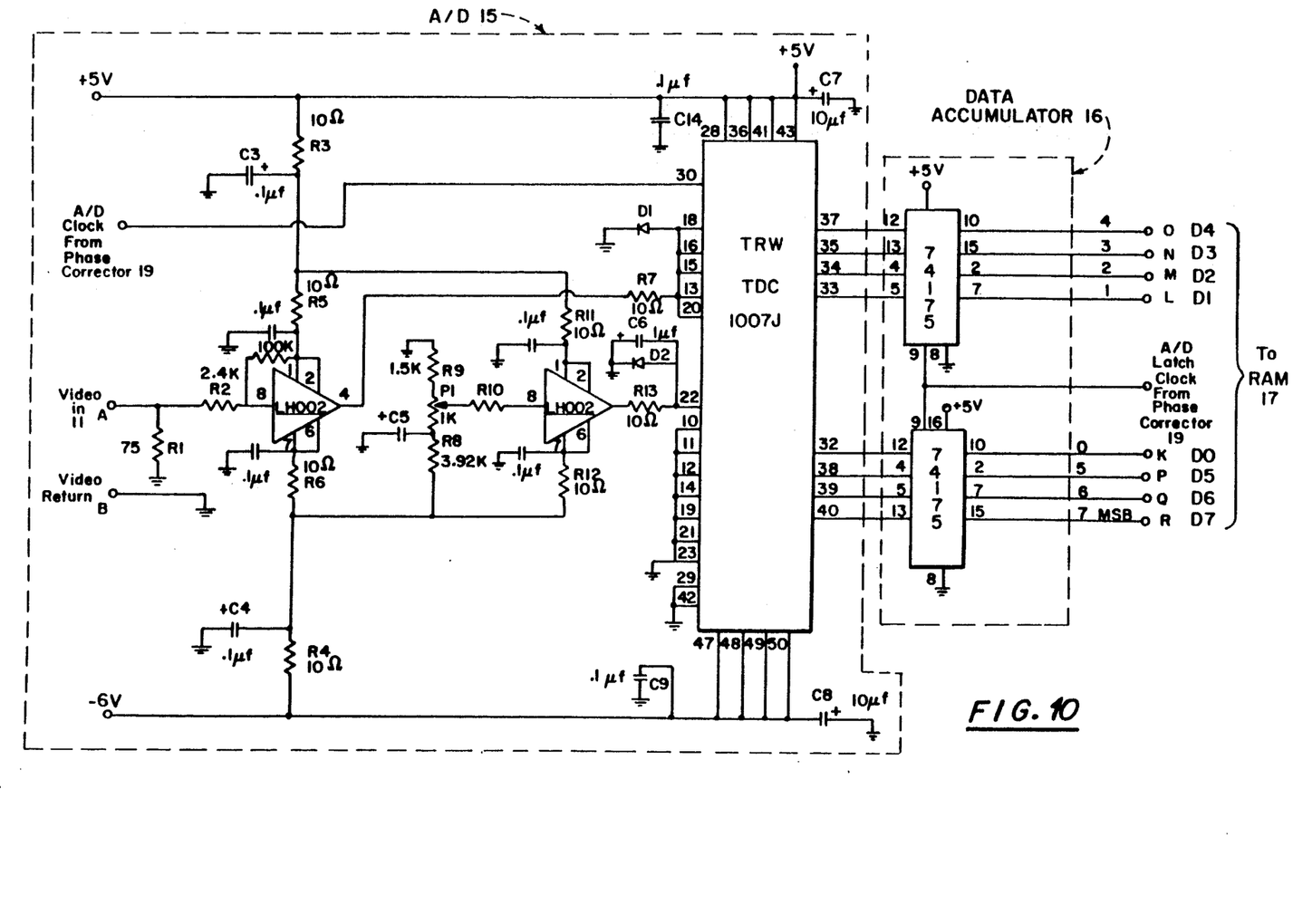
FIG. 10 is a schematic representation of the analog-to-digital converter.

The analog-to-digital converter is set forth in detail in FIG. 10 of the drawings and provides digital signals which are representative of the analog form of the pixel elements in the incoming field of video information. The digital converter in the A to D converter is an 8 bit form and feeds information to a data accumulator 16 that combines four pixels from A to D converter and provides for internal storage during an accumulation period. Details of the data accumulator also are set forth in FIG. 10 and it has as the capability for passing the stored information as 32 bits into the slower memory of random access memory 17.

Figure 5:
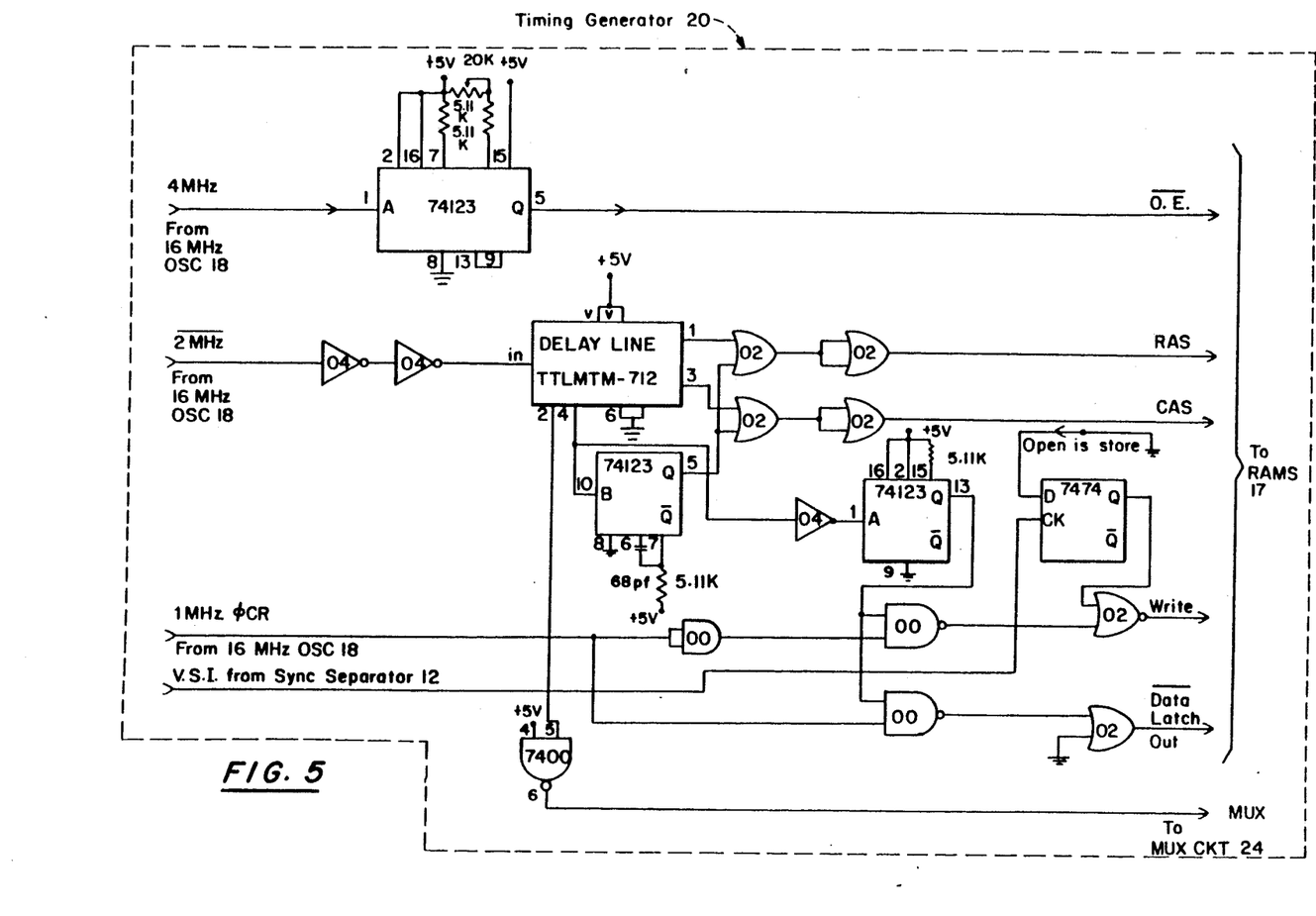
FIG. 5 depicts circuit components forming the timing generator.
Figure 6A:
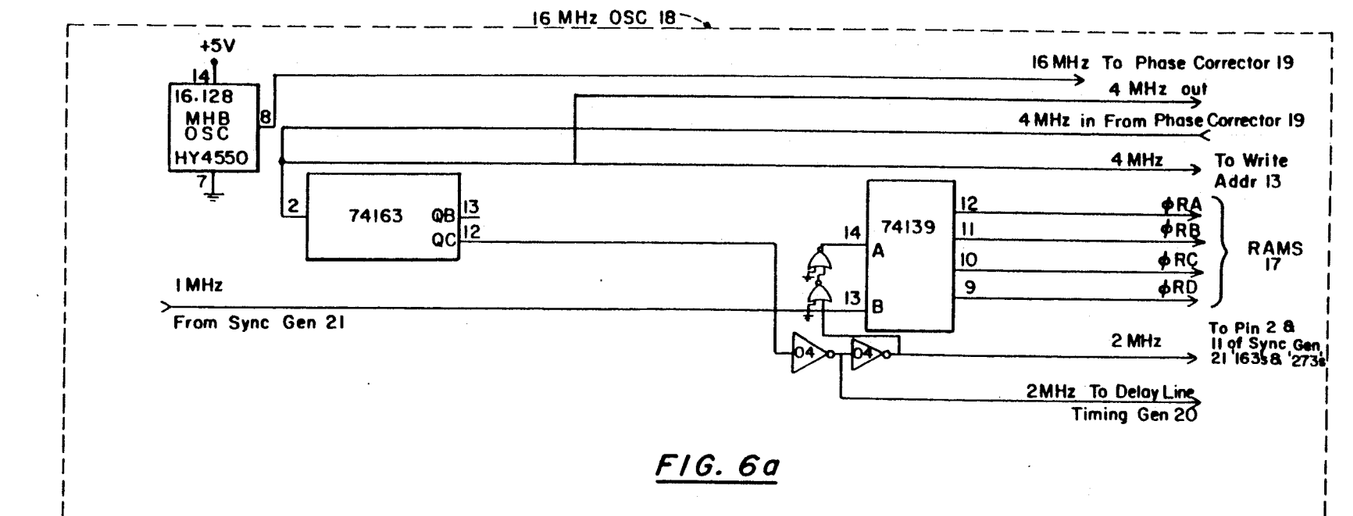
FIG. 6a shows the details of the 16 MHZ oscillator.
Figure 7:
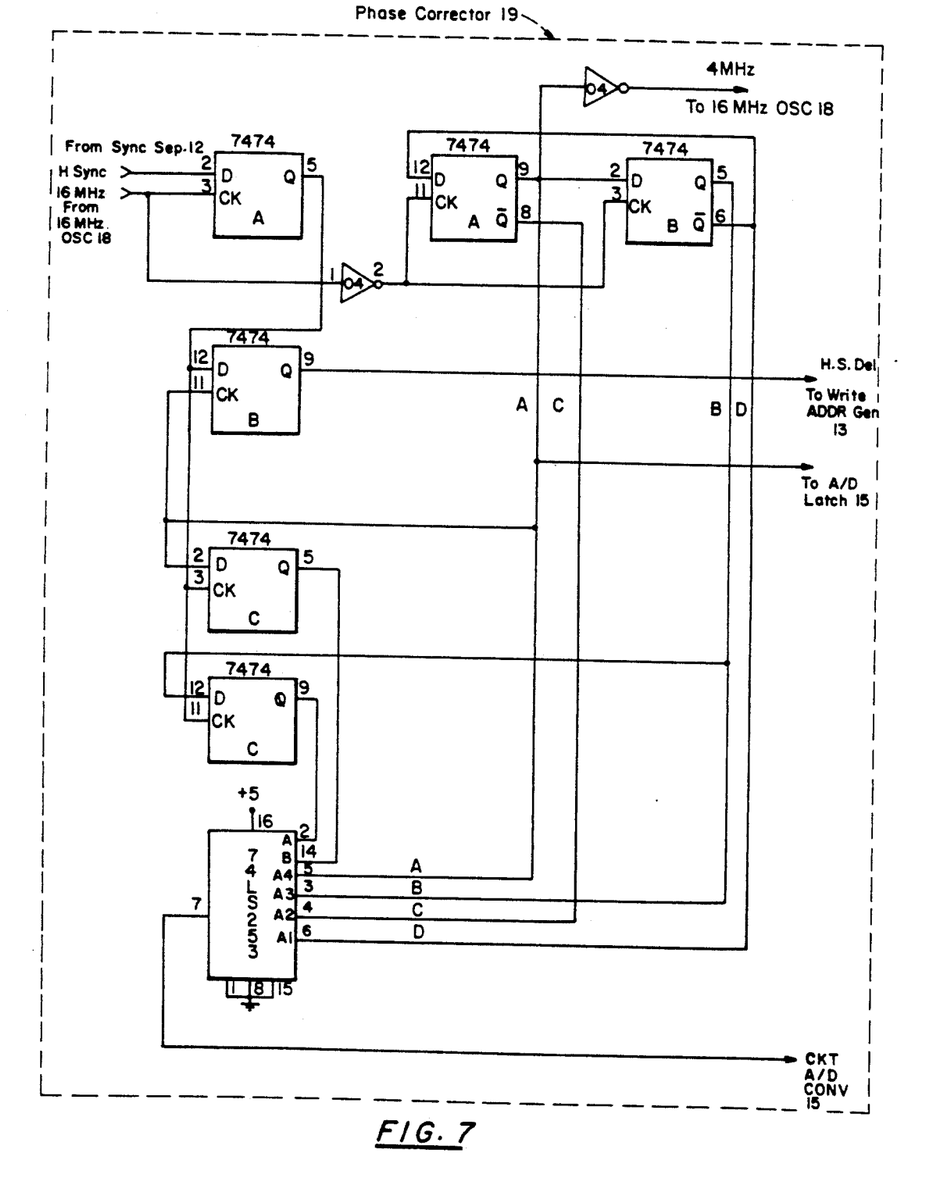
FIG. 7 shows the phase corrector.

A 16 MHZ clock 18 feeds clock signals to a phase corrector 19. The specific components forming these two circuits are shown in detail in FIGS. 6a and 7 respectively. The phase corrector feeds signals to the analog-to-digital converter to effect its signal processing operation and a 4 MHZ signal is coupled to data accumulator 16 as well as to an interconnected timing generator 20, the details of which are shown in FIG. 5. The timing signals to the analog digital converter, data accumulator and timing generator assure the quantizing of each pixel of the remotely originating video field signal, the alignment of each line of pixels and the synchronization of memory 17 for loading via the memory multiplexer 23.

Figure 3:
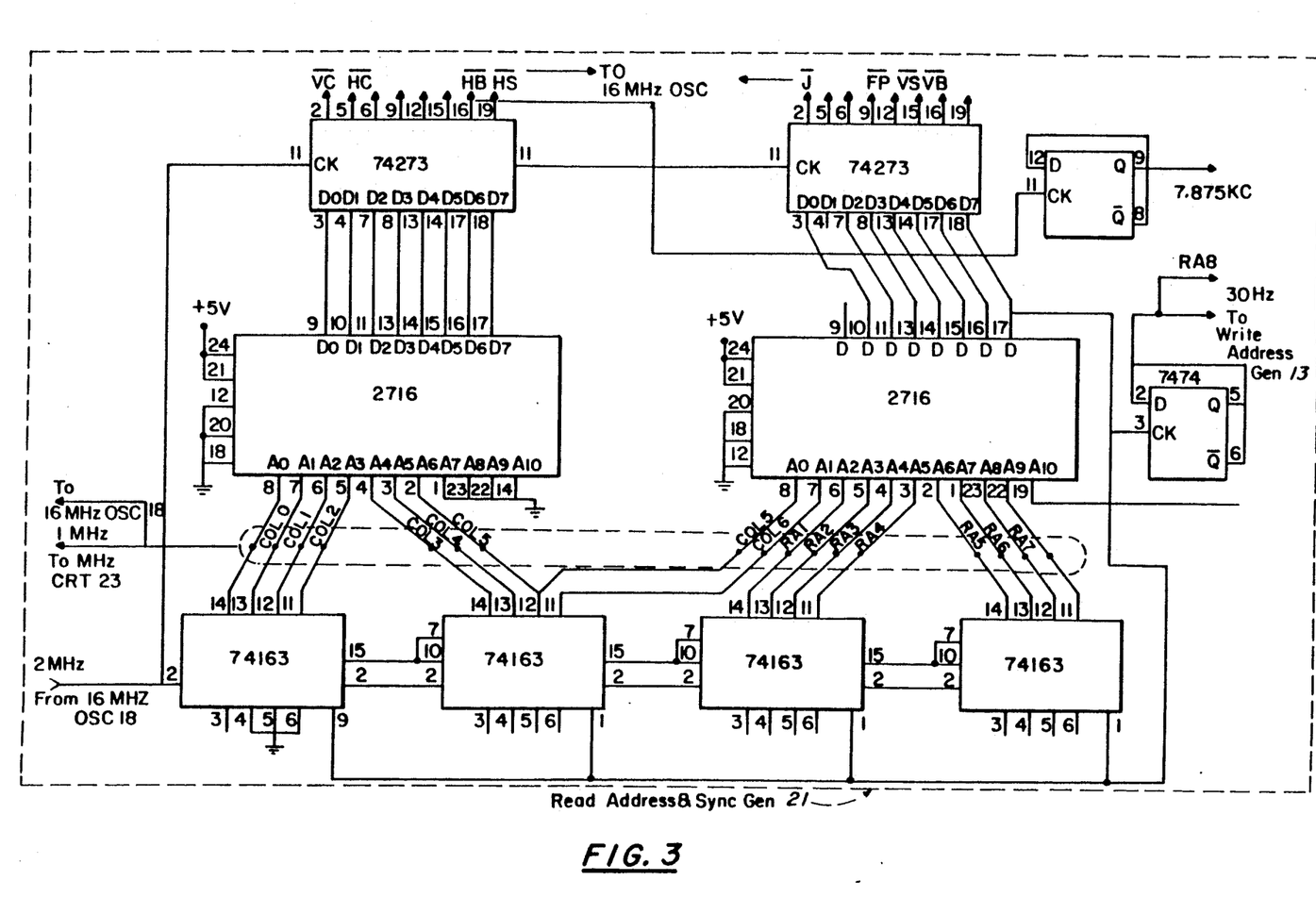
FIG. 3 depicts the constituents of the read-address and synchronization generator operatively associated with the other principle constituents of the invention.
Figure 9:
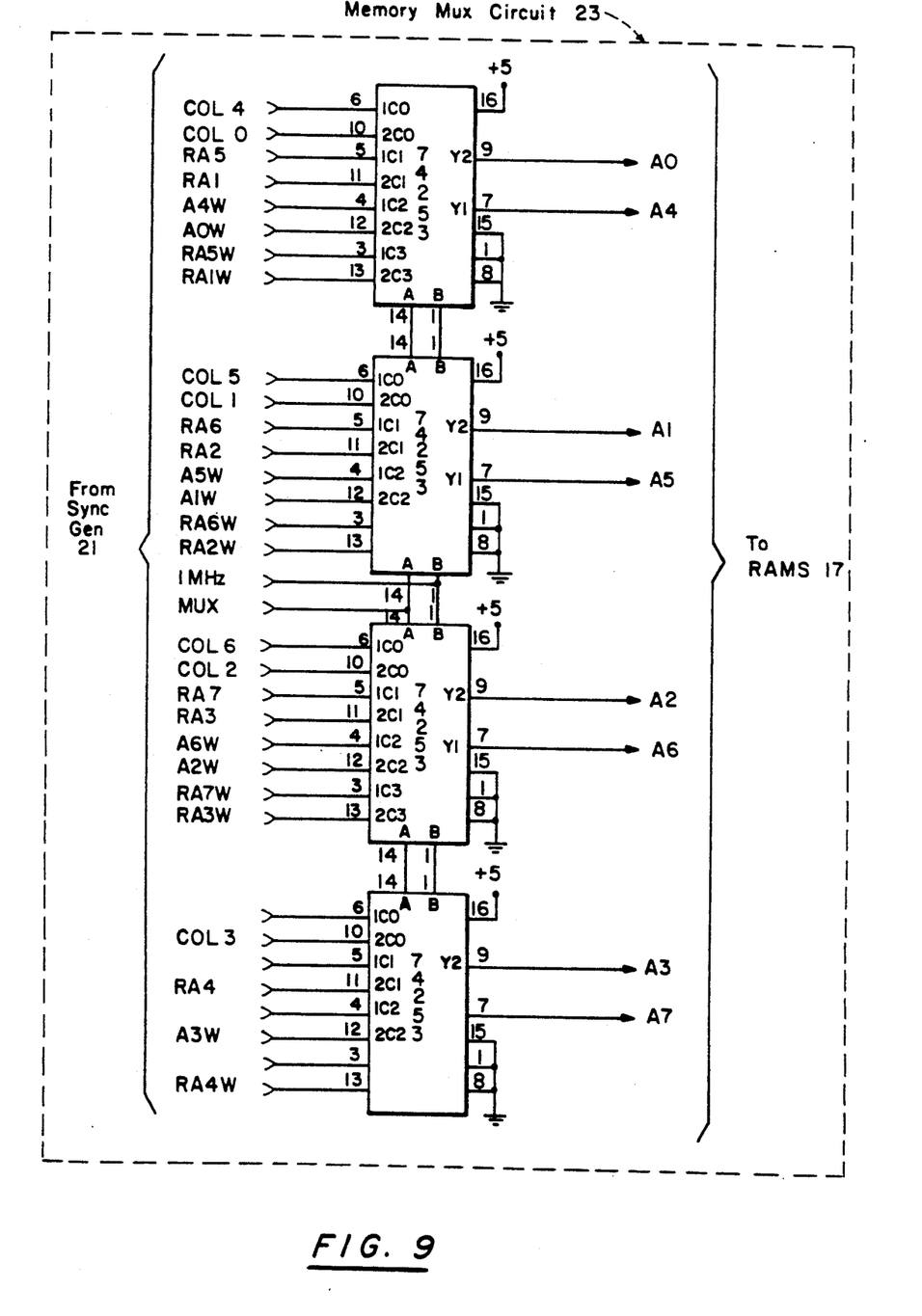
FIG. 9 shows the memory multiplexer circuit.
Figure 11:
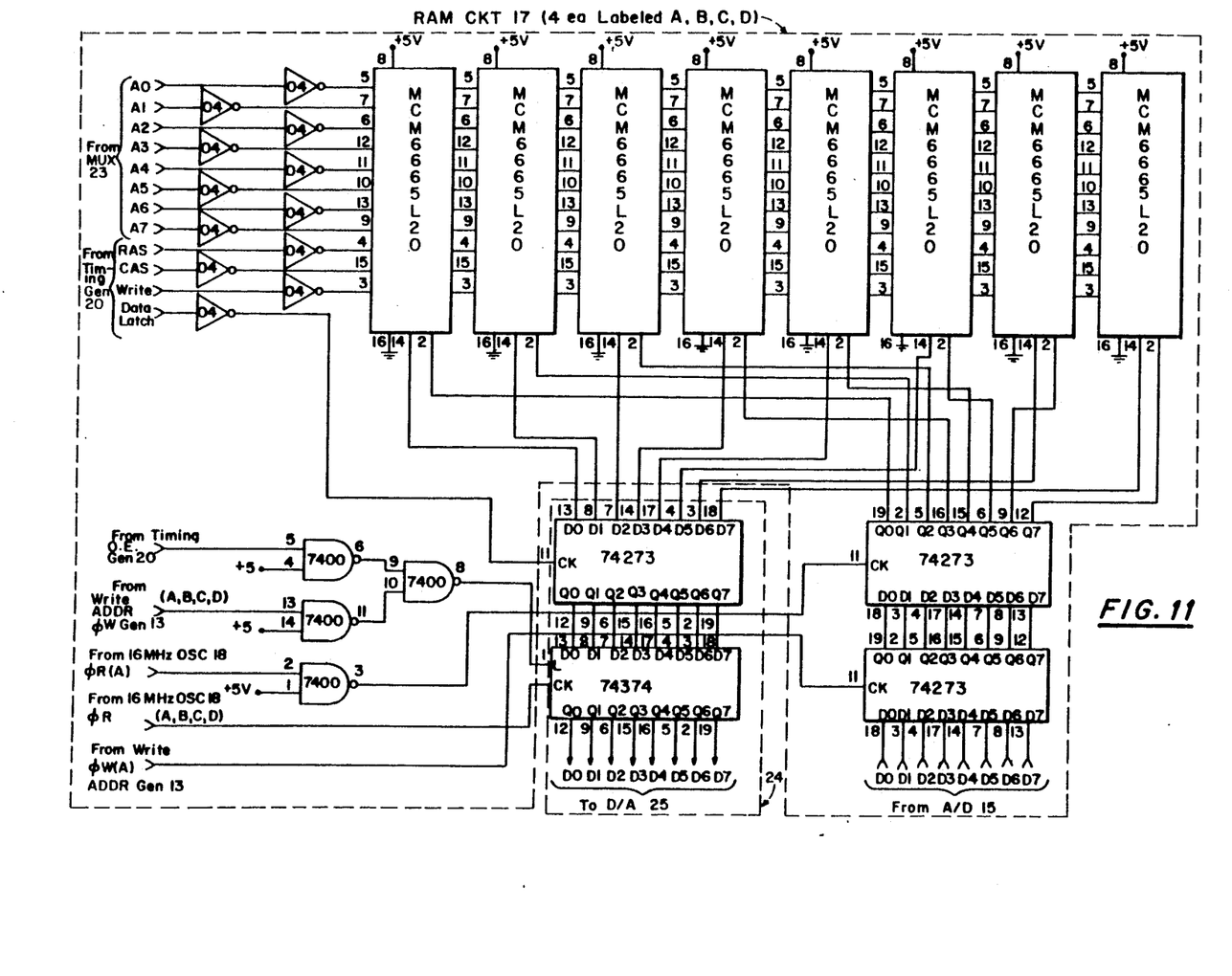
FIG. 11 is the random access memory circuit.

The timing generator is operatively coupled to write-address generator 13 to transfer a 4 MHZ timing signal thereto and to a read-address and synchronization generator 21 within address generator 22. The details of the memory multiplexer circuit are shown in FIG. 9 and memory 17 is shown in FIG. 11 while the read-address and sync generator 21 is set out in FIG. 3.

Figure 12:
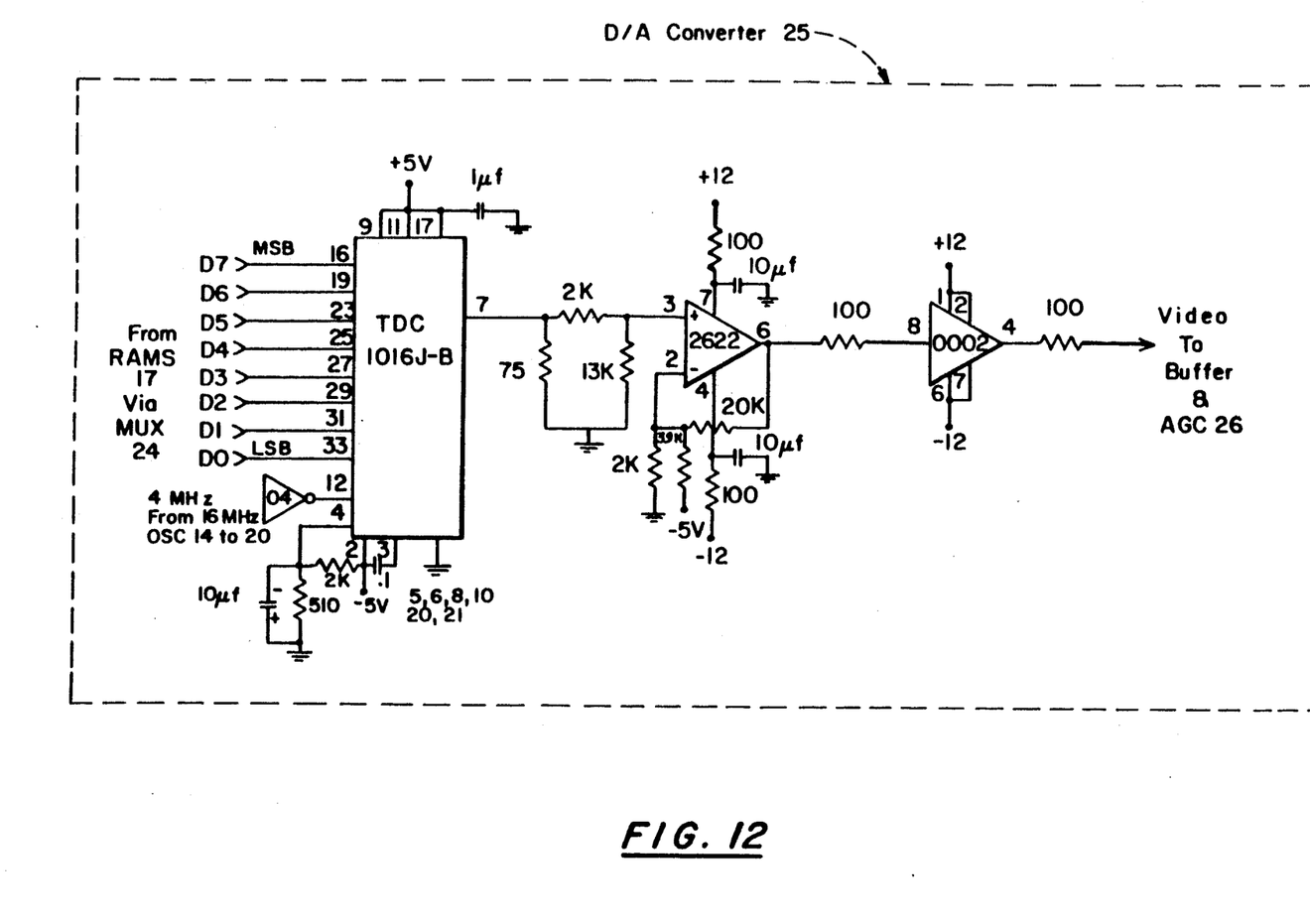
FIG. 12 shows the details of the digital-to-analog converter.

The timing generator effects a writing in of the accumulated four pixels from data accumulator 16 data to the memory 17 via memory multiplexer 23 such that the information will be written into memory 17 within the speed capabilities of the memory. In similar manner, the timing generator effects the reading out of the memory 17 via the read-address and synchronization generator 21 in a format that will yield a digital representation of a real-time video field at a standard frequency to a multiplexer 24. The multiplexer 24 also is shown in FIG. 11 having its output leads coupled to the digital-to-analog converter 25. The details of the digital to analog converter are shown in FIG. 12.

As mentioned above, timing generator 20 connects to memory multiplexer 23 and initiates the read-address generator 21 to sequentially unload RAM 17 into multiplexer 24 at 4 pixels at a time. The reading out is performed as a function of the standard frequency as established by 16 megahertz oscillator 18. The multiplexer 24 feeds digital-to-analog converter 25 one pixel at a time (eight bits of information each) and the converter reconstitutes the analog form. The constituents of this converter are set forth in FIG. 12.

Figure 4A:
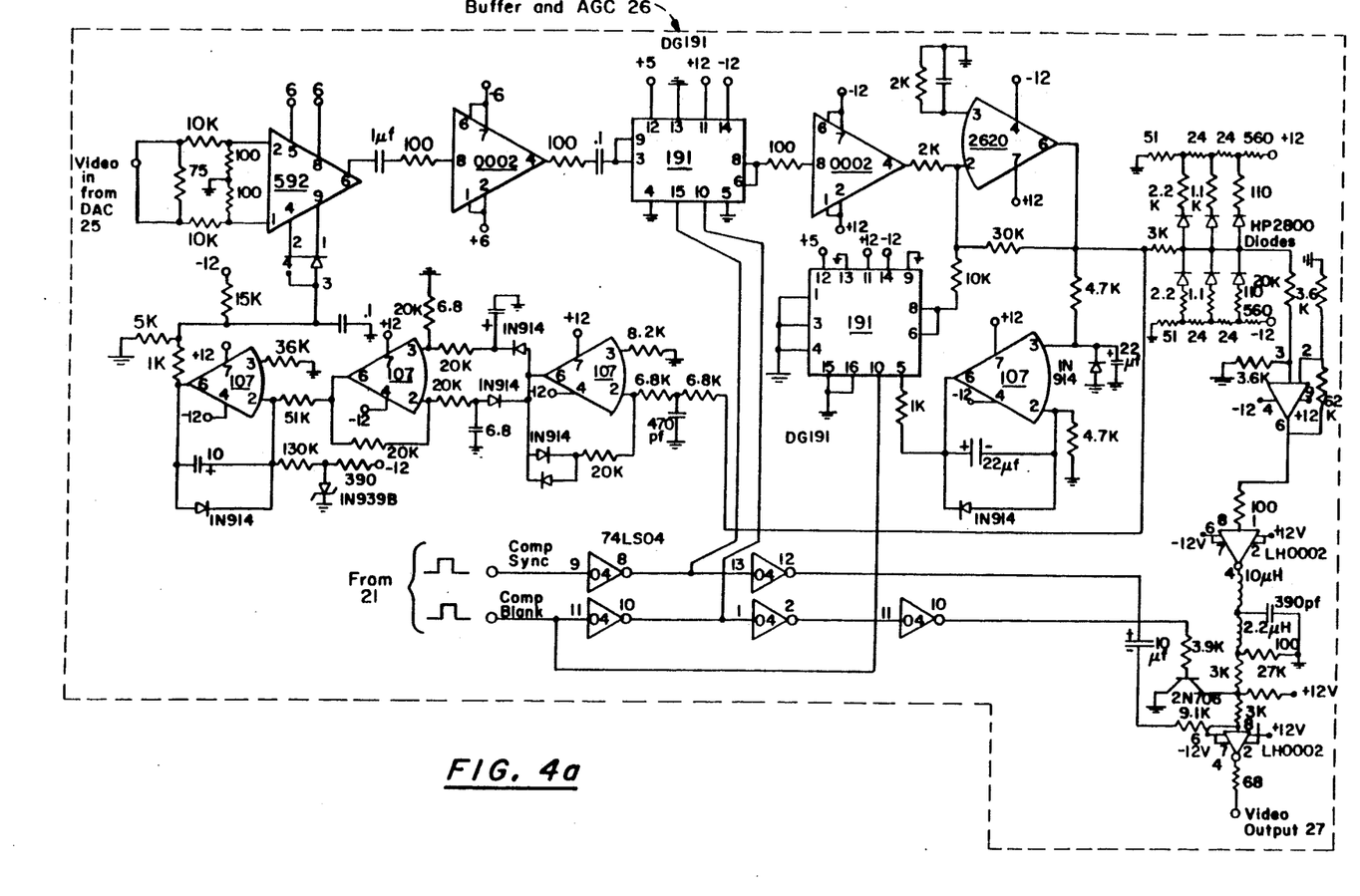
FIG. 4a shows the details of the buffer and automatic gain control circuit providing the outputted video signal at standard frequency rates.
Figure 4B:
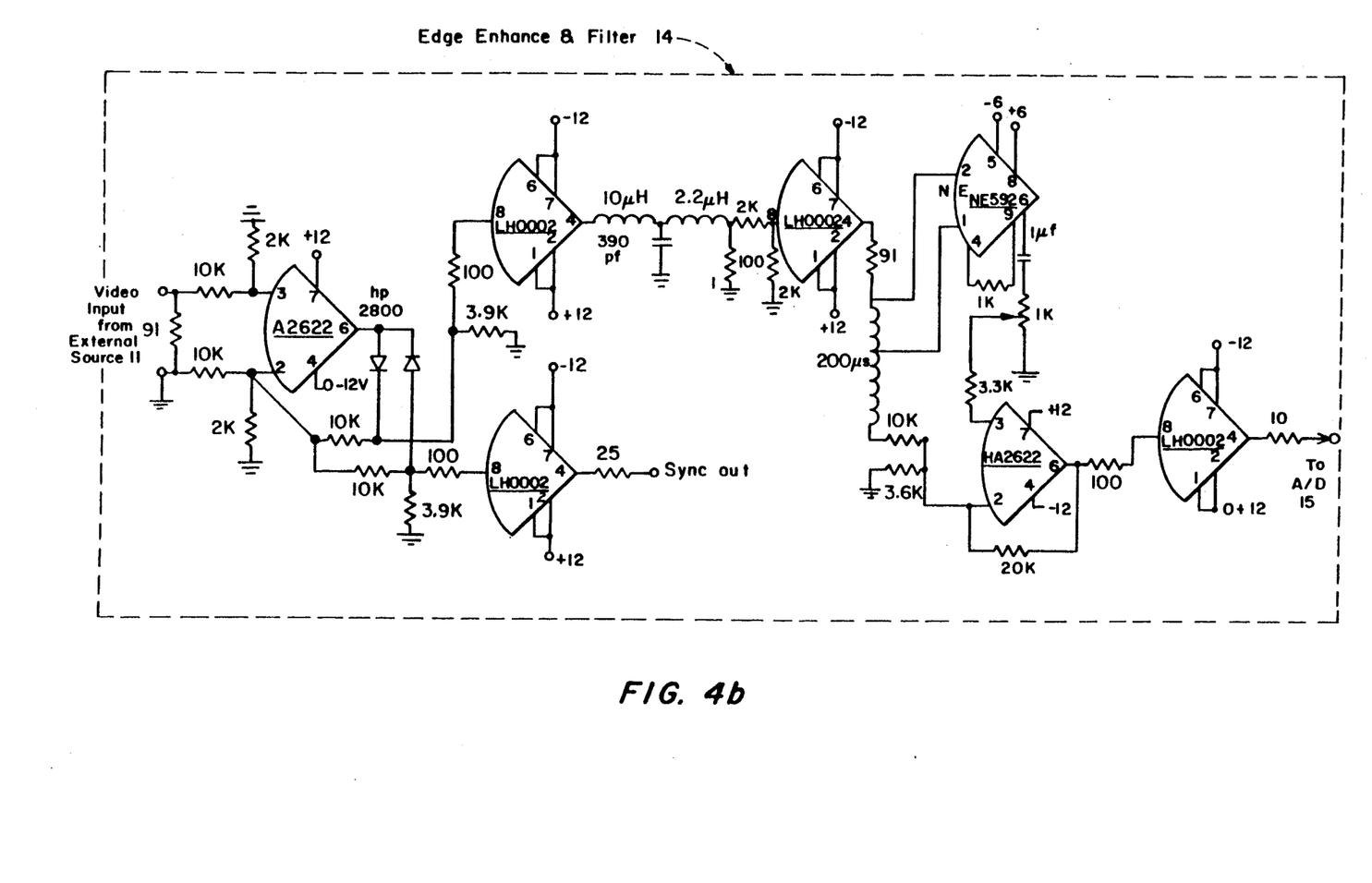
FIG. 4b shows the circuit components of the edge enhance and filter circuit receiving the externally originating video field signals.
Figure 6B:
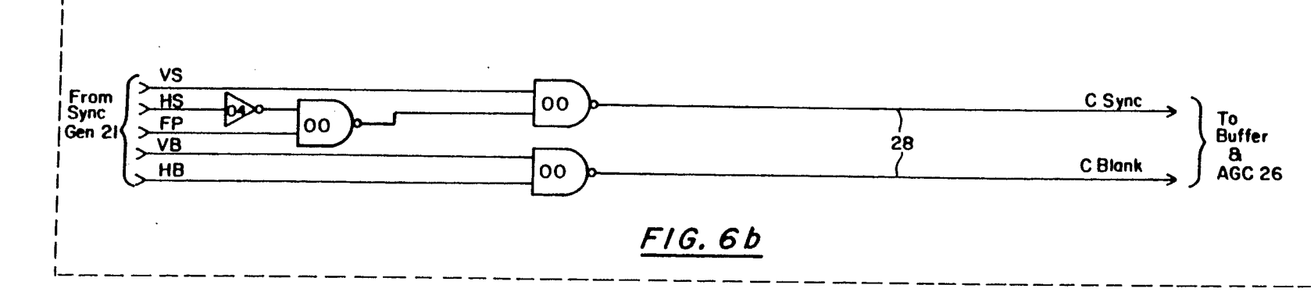
FIG. 6b shows the interconnection running between the read address and synchronization generator and the buffer and automatic gain control circuit.

The video is then limited, buffered and automatically gain-adjusted by a buffer and automatic gain control 26, details in FIG. 4a, to give a field by field video output at 27 that is stabilized with respect to the standard frequency of oscillator 18. The reading out of the digital data from memory 17 was facilitated by read-address and synchronization generator 21 which also has an interconnection lead 28 provided to assure the standard frequency reconstruction of the remotely originating video field. The details of the coupling 28 are shown in FIG. 6b.

In operation the remotely originating video signals on a field-by-field basis are received at 11 and the horizontal and vertical synchronization pulses are stripped and separated by synchronization stripper and separator 22. The incoming video is converted to digital form in A to D converter 15 after having passed through edge enhancer and filter 14 and stored briefly in data accumulator 16. A memory multiplexer 23 under the control of write-address generator 13 feeds in the digital representations of the remotely originated video from accumulator 16 and multiplexes them into memory 17. A read-address and synchronization generator 21 reads out the stored data from the memory 17 via the memory multiplexer within the time reference established by standard frequency oscillator 18 via its interconnected phase corrector 19 and timing generator 20. The read out data from memory 17 goes to multiplexer 24 which couples the data to a digital-to-analog converter 25 and to a buffer and automatic gain control circuit 26 which provides a video signal at standard frequency at an output 27.

The multiplexer 23, memory 17, multiplexer 24 and associated switching are required to handle the high data content of the video signal so that the digital data can be stored and retrieved in real time and at field-by-field amounts. If data having a lower content were being time base corrected, the multiplexing functions could, in all likelihood, be dispensed with. However, since real time field-by-field quantities of video information are being time base corrected, the multiplexing technique and switching arrangement disclosed herein are required to effect the conversion of the remotely originating video fields of data into the video fields at the standard frequency.

Obviously, many modifications and variations of the present invention are possible in the light of the above teachings. It is therefore to be understood that within the scope of the appended claims the invention may be practiced otherwise than as specifically described.

What is claimed is:

1. An apparatus for synchronizing an externally originating video field signal with a local standard frequency source comprising:
    means for providing the externally originating video field signal;
    means coupled to receive the externally originating video field signal for stripping and separating the vertical and horizontal sync pulses;
    means coupled to receive the externally originating field signal for converting it to digital form;
    means for storing one field of said digital form of the externally originating video field signal;
    means for generating the local standard frequency;
    means coupled to the generating means and the converting means for correcting the phase of the converting means to convert the externally originating video field signal at 4 MHZ;
    means coupled to the phase correcting means and the storing means for timing digital data storage therein;
    means connected to the timing means, the storing means and the stripping and separating means for initiating the storing of sequential lines of the externally originating signal with the horizontal sync signal and sequential fields of the sequential lines with the vertical sync signal;
    means connected to the generating means and the storing means for extracting a stored field of lines from the storing means;
    means coupled to the storing means to receive the extracted stored field of lines for multiplexing the signal therein in sync with the local standard frequency at standard video field rates; and
    means coupled to the multiplexing means for reconverting digital data to analog form.

2. An apparatus according to claim 1 further including:
    an edge enhancer and filter circuit interposed to receive the externally originating video field signal to provide distinct signal inputs and to eliminate undesired noise for the converting means.

3. An apparatus according to claim 2 further including:
    a buffer and automatic gain control circuit connected to receive the analog form of the standard video field rate signal to provide for amplitude correction and isolation of a standardized video output signal.

4. An apparatus according to claim 3 further including:
    means coupled between the extracting means and the buffer and automatic gain control circuit for assuring the proper synchronizing and blanking of the standardized video output signal.

5. An apparatus according to claim 4 in which the storing means is a random access memory and a memory multiplexer circuit that are suitably connected to write in the lines at the field rate of the externally originating video field signal and the reading out of the stored lines at the standard frequency field rate.

6. An apparatus according to claim 5 further including:

a data accumulator interposed between the converting means and the random access memory that is adapted to store four bytes of the digital form.

7. An apparatus according to claim 6 in which the random access memory has a 64 K byte storage capability to enable the writing in, storage and reading out of one video field of lines.

8. An apparatus according to claim 7 in which the multiplexing means has the capability to receive four bytes of information simultaneously.

* * * * *